United States Patent [19]

Toder

[11] 4,282,630
[45] Aug. 11, 1981

[54] DRAPERY CARRIER ASSEMBLY

[76] Inventor: Ellis I. Toder, 341 Militia Hill Rd., Fort Washington, Pa. 19034

[21] Appl. No.: 69,333

[22] Filed: Aug. 23, 1979

[51] Int. Cl.³ .................. A47H 13/12; A47H 15/02
[52] U.S. Cl. .................. 16/93 D; 16/95 D; 206/343; 248/307;DIG. 9
[58] Field of Search ........... 16/87.4 R, 87.4 W, 94 D, 16/95 D, 96 D, 93 R, 93 D; 248/307, DIG. 9; 206/321, 343, 345, 346, 820

[56] References Cited

U.S. PATENT DOCUMENTS

| 2,966,695 | 1/1961 | Dwyer | 16/93 D |
|---|---|---|---|
| 3,522,621 | 8/1970 | Ford et al. | 16/87.4 R |
| 3,587,131 | 6/1971 | Graf | 16/95 D |
| 3,818,544 | 6/1974 | Helmer et al. | 16/94 D |
| 3,883,924 | 5/1975 | Grabman | 16/94 D |
| 3,939,974 | 2/1976 | Holzer | 206/820 X |
| 3,951,196 | 4/1976 | Salzmann | 16/87.4 R X |

FOREIGN PATENT DOCUMENTS

| 1291476 | 3/1969 | Fed. Rep. of Germany | 16/87.4 R |
|---|---|---|---|
| 7416355 | 6/1975 | Netherlands | 206/345 |
| 1029082 | 5/1966 | United Kingdom | 16/87.4 R |

Primary Examiner—Wm. Carter Reynolds
Attorney, Agent, or Firm—Walter B. Udell

[57] ABSTRACT

A plurality of drapery carriers are arranged and maintained in an aligned form from the point of production to installation in a drapery track. A group of such carriers are simultaneously molded in multiple cavities and interconnected by a tear strip molded simultaneously therewith so that they may all be removed from the mold as a unit, and may thereafter be handled as a unit until the carriers have been installed in a drapery track. Handling, inventory and installation times are minimized since a connected group of carriers can be handled at one time instead of having to individually deal with separate carriers.

4 Claims, 5 Drawing Figures

DRAPERY CARRIER ASSEMBLY

This invention relates to drapery carrier assemblies, and more particularly relates to a novel drapery carrier assembly which reduces the costs of handling, inventory and installation of a drapery in its use location.

Drapery carriers per se are not new, being used in conjunction with a drapery track for the hanging and positional control of draperies. Many forms of drapery carriers are known and in use, most all of which require individual handling at all stages of production, shipping, storage, sale and installation. The drapery carrier assembly according to the invention departs from this past practice in that it provides for a plurality of drapery carriers arranged and maintained in an aligned form from the point of production to installation in a drapery track. A group of aligned carriers could for example contain five or ten, or more, carriers held together in a unitary structure.

Many drapery carriers today are formed of molded plastics, and it is contemplated by the invention that a group of such carriers be simultaneously molded in multiple cavities and suitably interconnected so that they may all be removed from the mold as a unit, and may thereafter be handled as a unit until the carriers have been installed in a drapery track. This, of course, minimizes handling, since a connected group of ten carriers, for example, can be handled at one time instead of having to individually deal with ten separate carriers. Additionally, for purposes of inventory control, the inventory can be dealt with much more rapidly by dealing with unitary groups of ten carriers instead of having to deal with individual carriers by hand-counting each piece separately. Finally, when installing a drapery, instead of requiring each carrier to be individually placed into the carrier track with a careful count being maintained, it is only necessary to slip the interconnected units into the drapery track and then remove the interconnections between the carriers in order to quickly and efficiently set up the track and the carrier assemblies.

It is a primary object of the invention to provide a novel drapery carrier assembly in which a group of individual drapery carriers are interconnected to one another in a predetermined alignment.

Another object of the invention is to provide a novel drapery carrier assembly as aforesaid wherein the means for aligning the individual drapery carriers with respect to one another is quickly and easily removable to thereby separate the individual carriers from one another when the carriers have been installed in a drapery track and are ready for use.

A further object of the invention is to provide a novel drapery carrier assembly as aforesaid wherein the drapery carriers are at least partly formed of molded plastic, and are interconnected with one another by means of a plastic tear strip integrally molded to the carriers when the carriers are formed.

The foregoing and other objects of the invention will become clear from a reading of the following specification in conjunction with an examination of the appended drawings, wherein.

In the several figures, like elements are denoted by like reference characters.

Figure 1:
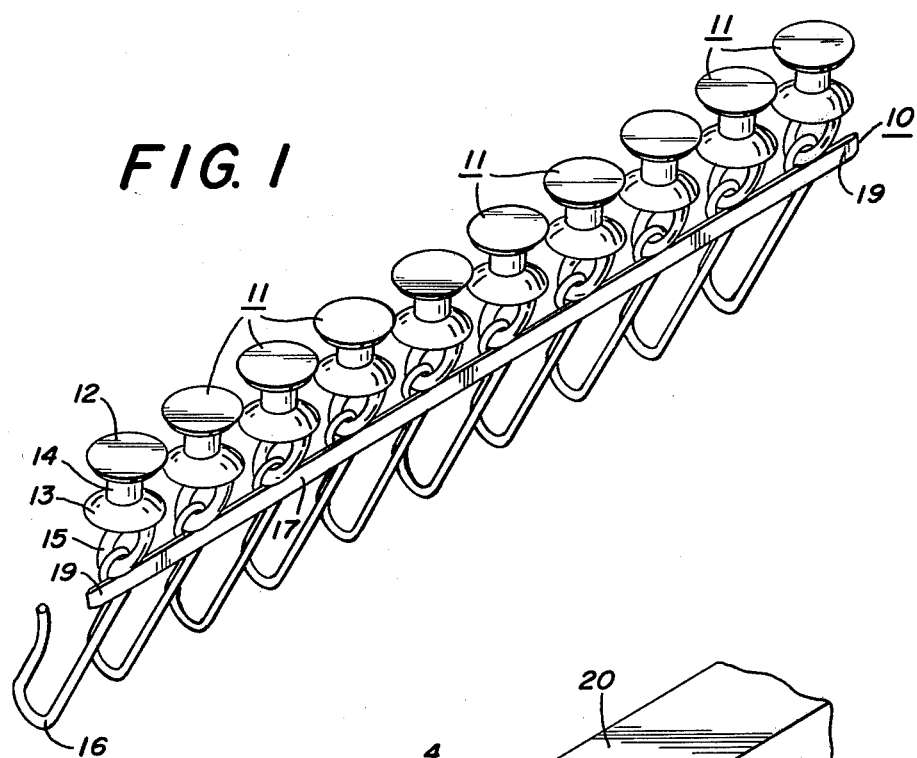
FIG. 1 is an isometric view from above of an illustrative drapery carrier assembly according to the invention.

Turning now to the drawings there is seen a drapery carrier assembly designated generally by the number 10. The assembly consists of ten carriers 11 each of which has a spool shaped body including upper and lower ends 12 and 13 connected by a circular cylindrical stem 14. The upper end 12 is dished on its under surface and the lower end 13 is reversely dished on its upper surface. Depending from the bottom surface of the lower end 13 is a loop 15, and rotatably secured through the loop 15 is a depending hook 16 from which the drapery is to be hung.

The carriers 11, including all of the parts 12 through 15 are integrally formed of molded plastic, whereas the hooks 16 will normally be made of metal and freely rotatable in the loops 15. Illustratively, the ten carriers 11 are simultaneously molded in a ten cavity mold in alignment as shown, the bottoms of the loops 15 of all ten carriers being joined together by a tear strip 17 molded simultaneously with the carriers 11, the tear strip 17 being joined to the bottom of each carrier loop 15 by a small area mold connection 18 best seen in the showings of FIGS. 3, 4 and 5.

Figure 2:
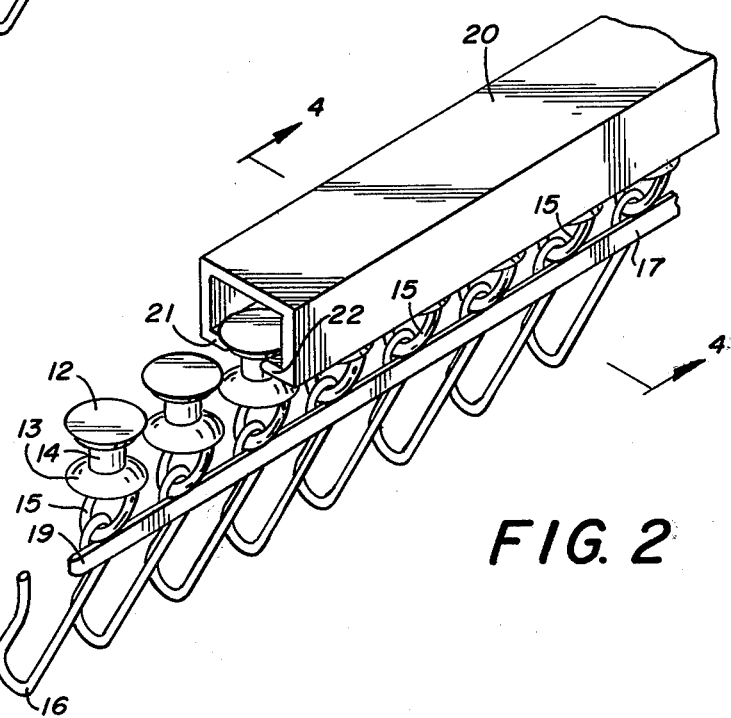
FIG. 2 is an isometric view illustrating the carrier assembly being installed into a drapery track.
Figure 4:
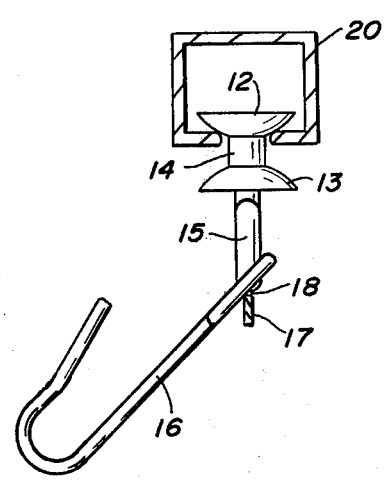
FIG. 4 is a cross-sectional view through the track and assembly as would be seen when viewed along the line of 4—4 of FIG. 2.
Figure 5:
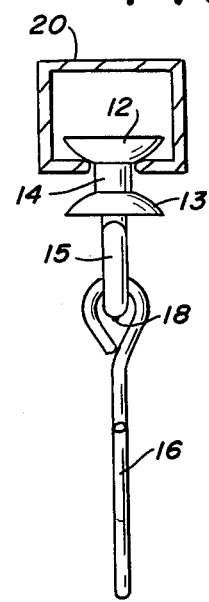
FIG. 5 is a cross-sectional view through the drapery track and carriers as would be seen when viewed along line 5—5 of FIG. 3.

The size of the mold connections is sufficient to prevent separation of the tear strip 17 from the carriers 11 due to normal handling, but is not of sufficient strength to resist tearing away and separation of the strip from the carriers by force deliberately imposed for that purpose. The tear strip 17 has ends 19 which may be grasped for the purpose of tearing the strip away from the carriers 11. As best seen in FIGS. 1, 2 and 4, when the assembly is intact with the tear strip 17 attached to the carriers 11, all of the hooks 16 are disposed to one side due to the presence of the tear strip 17. However, as best seen in FIGS. 3 and 5, when the tear strip 17 has been removed, the hooks 16 hang straight down in their normal use alignment position.

The assembly shown in FIG. 1 is easy to handle, easy to store and easy to take inventory of as compared with individual carriers 11. Additionally, as illustrated in FIGS. 2 and 3, the assembly is easy to load into a drapery track because the upper ends 12 of the carriers 11 are all in alignment so that they may be quickly slipped endwise into the interior of the drapery track 20 with the upper ends 12 disposed above the track legs 21 and 22 and with the carrier stems 14 passing into the track slot 23.

This effects great time savings in installing drapery systems, particularly in commercial systems which may have relatively long drapery runs extending through a single track. It is easy to quickly count the number of carriers disposed in the track by merely counting the number of assemblies and multiplying by the number of carriers per assembly. If the count is forgotten, it is quickly regained without having to count individual carriers.

Figure 3:
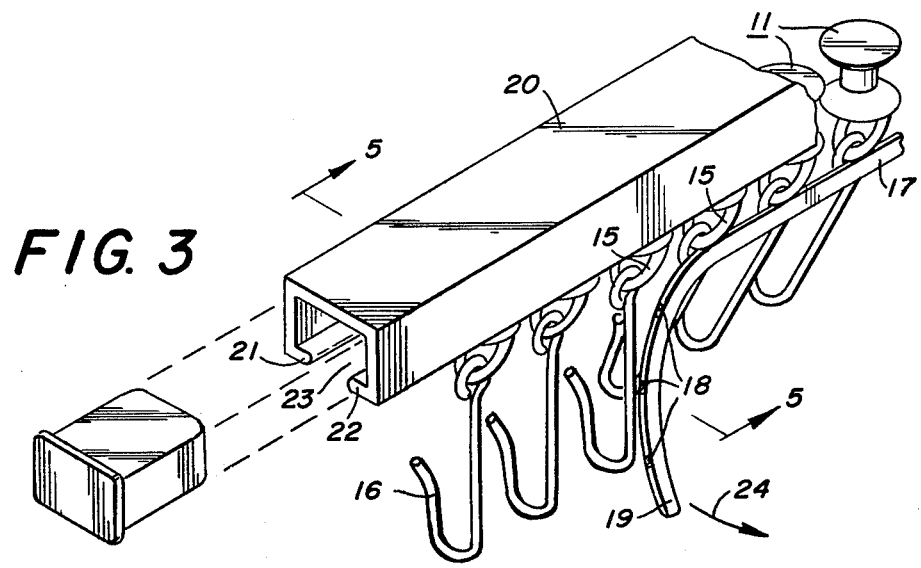
FIG. 3 is an isometric view of the drapery carrier assembly installed into the drapery track and with the tear strip in the process of being removed to separate the individual carriers one from another.

When an assembly 10 has been disposed within the drapery track 20, and it is time to install the drapery, it is only necessary to grasp an end 19 of the tear strip 17 and pull downward as shown by the arrow 24 in FIG. 3 in order to separate the tear strip 17 from the carriers 11. The tear strip 17 is of course disposed of and the carriers are ready to be used. While a particular form of drapery carrier has been shown in the drawings, such showing is for illustrative purposes only, the concept of the invention being applicable to drapery carriers of any configuration.

Having now described my invention in connection with a particularly illustrated embodiment thereof, it will be appreciated that variations and modifications of the invention may now occur from time to time to those persons normally skilled in the art without departing from the essential scope or spirit of the invention, and accordingly it is intended to claim the same broadly as well as specifically as indicated by the appended claims.

What is claimed is:

1. A drapery carrier assembly comprising in combinations,
   (a) a plurality of individual drapery carriers each of which is formed at least in part of molded plastic, and each of which includes a part carryable by a drapery track and means for securing the carrier to a drapery, all of said carriers in said assembly being positioned with respect to one another so that the said parts carryable by a drapery track are in alignment for sequential insertion into the drapery track, and
   (b) detachable means connected to all of said individual drapery carriers and effective until detached to maintain said drapery carriers in said alignment, said detachable means being connected to said molded plastic of each carrier by a rupturable molded plastic connection and is in the form of a tear strip having graspable means for tearing the strip from the carriers.

2. A drapery carrier assembly as described in claim 1 wherein said detachable means is formed at least in part of molded plastic.

3. A drapery carrier assembly as described in claim 1 wherein said detachable means is formed of molded plastic as an integral unit with the molded plastic of each carrier.

4. A drapery carrier assembly as described in claim 1 wherein the connection of said tear strip to each carrier is at a location external to the track in which said assembly is to be disposed.

* * * * *